(12) United States Patent
Zhu et al.

(10) Patent No.: US 11,483,801 B2
(45) Date of Patent: Oct. 25, 2022

(54) RESOURCE CONFIGURATION METHOD AND APPARATUS

(71) Applicant: HUAWEI TECHNOLOGIES CO., LTD., Guangdong (CN)

(72) Inventors: Fangyuan Zhu, Beijing (CN); Yan Li, Beijing (CN); Shiyong Tan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 16/778,162

(22) Filed: Jan. 31, 2020

(65) Prior Publication Data
US 2020/0169989 A1  May 28, 2020

Related U.S. Application Data

(63) Continuation of application No. PCT/CN2018/094544, filed on Jul. 4, 2018.

(30) Foreign Application Priority Data

Aug. 4, 2017 (CN) .......................... 201710660664.4

(51) Int. Cl.
*H04W 4/00* (2018.01)
*H04W 72/04* (2009.01)
(Continued)

(52) U.S. Cl.
CPC ........... *H04W 72/04* (2013.01); *H04W 72/12* (2013.01); *H04W 76/10* (2018.02)

(58) Field of Classification Search
CPC .. H04W 72/04; H04W 72/12; H04W 72/1263
See application file for complete search history.

(56) References Cited

U.S. PATENT DOCUMENTS

| 11,134,103 B2 * | 9/2021 | Kunz | H04W 60/00 |
| 2015/0294117 A1 * | 10/2015 | Cucinotta | G06F 21/602 |
| | | | 713/189 |

(Continued)

FOREIGN PATENT DOCUMENTS

| CN | 104636146 A | 5/2015 |
| CN | 106060900 A | 10/2016 |

(Continued)

OTHER PUBLICATIONS

SA WG2 Meeting #120, S2-170863: "Solution to Key issue #X: Enforce Access Restriction at the eNB", NEC, Dubrovnik, Croatia, Feb. 13-17, 2017, total 4 pages.

(Continued)

*Primary Examiner* — Shantell L Heiber

(57) ABSTRACT

This application discloses a resource configuration method and apparatus. The method includes: obtaining, by a terminal, a slice attribute corresponding to a slice type of a first session, where the slice attribute corresponding to the slice type includes at least one of a security requirement or a latency requirement of the slice type; and performing resource configuration for the first session based on the slice attribute. In this way, a security requirement and/or a latency requirement of network slices can be implemented on a terminal side.

17 Claims, 7 Drawing Sheets

(51) Int. Cl.
*H04W 76/10* (2018.01)
*H04W 72/12* (2009.01)

(56) References Cited

U.S. PATENT DOCUMENTS

| | | | |
|---|---|---|---|
| 2017/0367036 A1* | 12/2017 | Chen | H04L 43/10 |
| 2018/0007552 A1* | 1/2018 | Bae | H04L 63/08 |
| 2018/0035399 A1* | 2/2018 | Xu | H04W 8/06 |
| 2018/0049015 A1* | 2/2018 | Gupta | H04W 48/12 |
| 2018/0192445 A1 | 7/2018 | Jiang | |
| 2018/0220438 A1* | 8/2018 | Liu | H04W 72/1289 |
| 2019/0037409 A1* | 1/2019 | Wang | H04W 8/08 |
| 2019/0230584 A1 | 7/2019 | Lou et al. | |

FOREIGN PATENT DOCUMENTS

| | | |
|---|---|---|
| CN | 106572516 A | 4/2017 |
| CN | 106851589 A | 6/2017 |
| CN | 106982458 A | 7/2017 |
| WO | 2017059829 A2 | 4/2017 |

OTHER PUBLICATIONS

Huawei et al. "Radio Resource Management for Network Slicing", 3GPP TSG-RAN WG2 NR Ad Hoc R2-1700101, Spokane, Washington, USA, Jan. 17-19, 2017, total 4 pages.

Nokia et al.."Access Control applicability to different RRC states", 3GPP TSG-RAN WG2 NR Adhoc#2 R2-1706984, Qingdao, China, Jun. 27-29, 2017, Total 4 Pages.

Huawei et al.,"UE Awareness of Network Slice", 3GPP TSG-RAN WG2 Adhoc#2 R2-1706777, Qingdao, China, May 27-29, 2017, total 3 pages.

Xiaomi, "Report of email discussion: [97bis#14][NR] Slicing", 3GPP TSG-RAN NR #2 R2-1706871, Qingdao, China, Jun. 27-29, 2017, total 37 pages.

Qualcomm Incorporated, "Slice Isolation in RAN", 3GPP TSG-RAN WG3 Meeting #94 R3-162828, Reno, USA, Nov. 14-18, 2016, total 4 pages.

Extended European Search Report issued in European Application No. 18841911.3, dated May 26, 2020, total 11 pages.

International Search Report issued in PCT/CN2018/094544 dated Sep. 26, 2018 (4 pages).

* cited by examiner

RESOURCE CONFIGURATION METHOD AND APPARATUS

CROSS-REFERENCE TO RELATED APPLICATIONS

This application is a continuation of International Application No. PCT/CN2018/094544, filed on Jul. 4, 2018, which claims priority to Chinese Patent Application No. 201710660664.4, filed on Aug. 4, 2017. The disclosures of the aforementioned applications are hereby incorporated by reference in their entireties.

TECHNICAL FIELD

This application relates to the field of communications technologies, and in particular, to a resource configuration method and apparatus.

BACKGROUND

In the era of 5th generation mobile communications technologies (5G), hundreds of millions of internet of things devices access a network, and different types of application scenarios have different requirements on the network. Providing services for different types of application scenarios by using a single network causes an extremely complex network architecture, and low network management efficiency and resource utilization efficiency. In 5G network slicing technologies, network environments isolated from each other are provided for the different application scenarios in a manner of virtualizing an independent logical network on a same network infrastructure, so that network functions and characteristics can be customized for the different application scenarios based on respective requirements, and quality of service (QoS) requirements of different services can be effectively ensured.

A 5G system needs to support diversified commercial modes and meet requirements of different industries and different applications by using end-to-end network slices. Existing network slicing technology discussion is mainly limited to implementation on a core network side. How to ensure key performance indicators (KPI) such as security and latency requirements of network slices on a terminal side while the terminal side perceives the network slice is a problem that urgently needs to be resolved.

SUMMARY

Embodiments of this application provide a resource configuration method and apparatus, to implement a security requirement and/or a latency requirement of network slices on a terminal side.

Specific technical solutions provided in the embodiments of this application are as follows:

According to a first aspect, an embodiment of this application provides a resource configuration method. The method includes: obtaining, by a terminal, a slice attribute corresponding to a slice type of a first session, where the slice attribute corresponding to the slice type includes at least one of a security requirement or a latency requirement of the slice type; and performing, by the terminal, resource configuration for the first session based on the slice attribute. Therefore, by using the method provided in this embodiment of this application, the terminal implements, based on the slice attribute corresponding to the slice type, that is, at least one of the security requirement or the latency requirement, slice type-based resource isolation and/or priority resource scheduling, thereby providing differentiated security protection and resource configurations. Therefore, data security of an application on the terminal is ensured, and not only latency, reliability, and security requirements of the application can be met, but also terminal resources can be effectively used, to implement end-to-end SLA assurance.

In a possible embodiment, the obtaining, by a terminal, a slice attribute corresponding to a slice type of a first session includes: sending, by the terminal, a session establishment request message to a control plane network element, and receiving a session establishment accept message from the control plane network element, where the session establishment accept message carries the slice type of the first session; and obtaining, by the terminal based on a mapping relationship that is between each slice type and each slice attribute and that is locally stored in the terminal, the slice attribute corresponding to the slice type of the first session. In this embodiment, the terminal locally configures the security requirement and/or the latency requirement corresponding to each network slice type. After session establishment of the first session is completed, the terminal determines, based on the security requirement corresponding to the first session, whether to provide an isolated resource for the first session, thereby ensuring security of an end-to-end network slice, and determines, based on the latency requirement corresponding to the first session, whether high-priority resource scheduling needs to be provided for the first session, to ensure latency of the end-to-end network slice.

In a possible implementation, the obtaining, by a terminal, a slice attribute corresponding to a slice type of a first session includes: sending, by the terminal, a session establishment request message to a control plane network element, and receiving a session establishment accept message from the control plane network element, where the session establishment accept message carries the slice attribute corresponding to the slice type of the first session, and the slice attribute is the security requirement of the slice type. In this implementation, in a session establishment process of the first session, the terminal receives the security requirement that is of the first session and that is returned by the control plane network element, to trigger the terminal to perform resource isolation on a terminal side based on the security requirement, thereby ensuring security of an end-to-end network slice.

In a possible implementation, the performing, by the terminal, resource configuration for the first session based on the slice attribute includes: if the slice attribute includes the security requirement of the slice type, determining, by the terminal based on the security requirement of the slice type, whether to provide an isolated resource for the first session. In this implementation, the terminal determines, based on the security requirement of the slice type, whether an isolated resource needs to be provided for the first session, and implements resource configuration by using the security requirement, thereby ensuring end-to-end security.

In a possible implementation, the performing, by the terminal, resource configuration for the first session based on the slice attribute further includes: if the slice attribute includes the latency requirement of the slice type, determining, by the terminal based on the latency requirement of the slice type, whether to provide high-priority resource scheduling for the first session. In this embodiment, the terminal determines, based on the latency requirement of the slice type, whether the high-priority resource scheduling needs to be provided for the first session, and implements resource configuration by using the latency requirement, thereby ensuring end-to-end latency. It can be learned that, when the terminal implements resource configuration by using the security requirement and the latency requirement, the two requirements are independent of each other, and do not affect each other.

According to a second aspect, an embodiment of this application provides a resource configuration apparatus. The apparatus includes: an obtainer, configured to obtain a slice attribute corresponding to a slice type of a first session, where the slice attribute corresponding to the slice type includes at least one of a security requirement or a latency requirement of the slice type; and a processor, configured to perform resource configuration for the first session based on the slice attribute.

In a possible implementation, when obtaining the slice attribute corresponding to the slice type of the first session, the obtainer is specifically configured to: send a session establishment request message to a control plane network element, and receive a session establishment accept message from the control plane network element, where the session establishment accept message carries the slice type of the first session; and obtain, based on a mapping relationship that is between each slice type and each slice attribute and that is locally stored in the terminal, the slice attribute corresponding to the slice type of the first session.

In a possible implementation, when obtaining the slice attribute corresponding to the slice type of the first session, the obtainer is specifically configured to: send a session establishment request message to a control plane network element, and receive a session establishment accept message from the control plane network element, where the session establishment accept message carries the slice attribute corresponding to the slice type of the first session, and the slice attribute is the security requirement of the slice type.

In a possible implementation, when performing resource configuration for the first session based on the slice attribute, the processor is specifically configured to: if the slice attribute includes the security requirement of the slice type, determine, based on the security requirement of the slice type, whether to provide an isolated resource for the first session.

In a possible implementation, when performing resource configuration for the first session based on the slice attribute, the processor is further configured to: if the slice attribute includes the latency requirement of the slice type, determine, based on the latency requirement of the slice type, whether to provide high-priority resource scheduling for the first session.

According to a third aspect, an embodiment of this application provides a terminal. The terminal includes a transceiver, a processor, and a memory. The transceiver, the processor, and the memory may be connected by using a bus system. The memory is configured to store a program, an instruction, or code, and the processor is configured to execute the program, the instruction, or the code in the memory to complete the method according to the foregoing first aspect or any possible implementation of the first aspect.

According to a fourth aspect, an embodiment of this application provides a computer-readable storage medium. The computer-readable storage medium stores instructions, and when the instructions are run on a computer, the computer is enabled to perform the method according to the first aspect.

According to a fifth aspect, an embodiment of this application provides a computer program product including instructions. When the instructions are run on a computer, the computer is enabled to perform the method according to the first aspect.

According to a sixth aspect, an embodiment of this application provides a chip system. The chip system includes a processor, configured to support a terminal in implementing functions involved in the first aspect. In a possible implementation, the chip system further includes a memory. The memory is configured to save instructions and data that are necessary for the terminal. The chip system may include a chip, or may include a chip and another discrete component.

It should be understood that, technical solutions in the second to the fifth aspects of the embodiments of this application are consistent with those in the first aspect of the embodiments of this application, and beneficial effects achieved by these aspects and corresponding implementable design manners are similar.

BRIEF DESCRIPTION OF DRAWINGS

The following detailed description of exemplary non-limiting illustrative embodiments is to be read in conjunction with the drawings of which.

DESCRIPTION OF EMBODIMENTS

The following clearly and completely describes the technical solutions in the embodiments of this application with reference to the accompanying drawings in the embodiments of this application.

Figure 1:
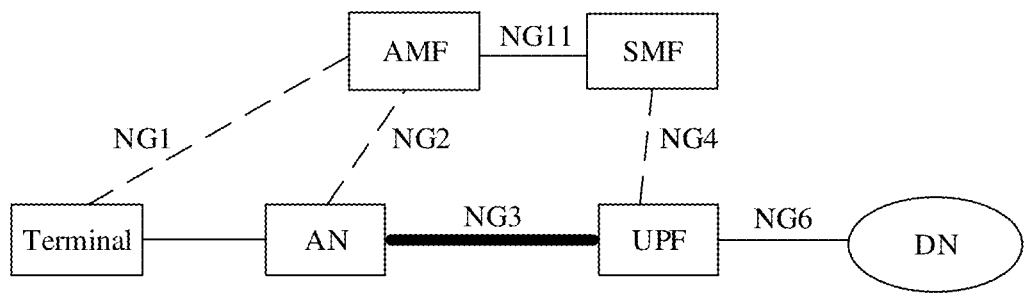
FIG. 1 is a schematic diagram of a next generation mobile network system architecture.

Based on a definition of the 3GPP, a network slice is a set including a group of network functions, resources for running these network functions, and configurations specific to these network functions. As shown in FIG. 1, the network slice may provide differentiated network features based on network requirements of specific services, for example, aspects such as a function, performance, security, and operation and maintenance, thereby reducing network complexity, improving network operation performance and user service experience, and reducing costs of network deployment, operation and maintenance.

A terminal may access one or more network slices, and a plurality of network slices may share some control plane functions, to implement a function, such as mobility management, of terminal granularity. The shared control plane functions are referred to as common control plane network functions (CCNF). Some other control plane functions and user plane functions are dedicated to the network slice, and are used to implement a specific service of the network slice.

When the network slice is deployed in a core network, if a user initially attaches to the network, a network slice selection process is triggered. The network slice selection process depends on subscription data of the user, local configuration information, a roaming agreement, an operator policy, and the like. In the network slice selection process, the foregoing parameters need to be comprehensively considered to select a most appropriate network slice type for the terminal.

When the terminal needs to access a network slice, the terminal may provide network slice selection assistance information (NSSAI) for the core network, so that the core network selects a network slice instance for the terminal. Specifically, the terminal may provide the network slice selection assistance information (NSSAI) for a network side, to select the network slice instance for the terminal.

(1) The NSSAI may be a standardized value or a particular value within a public land mobile network (PLMN). The NSSAI is a set of single network slice selection assistance information (S-NSSAI), and each piece of S-NSSAI is used to identify a network slice type.

(2) The terminal stores configured NSSAI and/or allowed NSSAI in each PLMN. The configured NSSAI is configured in the terminal before being exchanged with the PLMN, and is NSSAI that needs to be used during registration in the PLMN. A value of the configured NSSAI is default NSSAI configured on the terminal, and may be used by the terminal to select the network slice when the terminal registers with a network. The network side sends a registration request message to an appropriate AMF based on the configured NSSAI carried by the terminal. After the terminal is attached to the network, the network comprehensively determines the allowed NSSAI based on information such as subscription data, a roaming agreement, and local configuration of the terminal, and sends a value of the allowed NSSAI together with a registration accept message to the terminal. When subsequently initiating a service request, the terminal adds the value of the allowed NSSAI to the core network, to perform the network slice selection process. After the terminal is attached to the network, if the core network needs to update the allowed NSSAI of the terminal, a mobility management process (for example, a TAU process) may be triggered on the network side to update the allowed NSSAI locally stored in the terminal.

A 5G system needs to support diversified commercial modes and meet requirements of different industries and different applications by using end-to-end network slices. To meet a requirement of an end-to-end network slice service that can be ensured, a network slicing technology requires cooperation of technologies in various fields, for example, cooperation of a terminal, an access network, and a core network. Existing network slice technology discussion is mainly about implementation on the core network side. A terminal side needs to perceive a currently accessed network slice. When the terminal side perceives the network slice, how to ensure a KPI such as a security requirement and a latency requirement of the slice on the terminal side is a problem that urgently needs to be resolved.

In view of this, the embodiments of this application provide a resource configuration method and apparatus, to meet the security requirement and/or the latency requirement of the network slice on the terminal side. The method and the apparatus are based on a same inventive concept. Because a problem-resolving principle of the method is similar to that of the apparatus, implementations of the apparatus and the method may mutually refer to each other.

The resource configuration method in the embodiments of this application is applicable to a long term evolution (LTE) system or a next generation mobile network (5G) system. In addition, the resource configuration method in the embodiments of this application may also be applicable to another wireless communications system, for example, a global system for mobile communications (GSM), a mobile communications system (Universal Mobile Telecommunications System, UMTS), or a code division multiple access (CDMA) system.

The terminal in the embodiments of this application may refer to a device that provides a user with voice and/or data connectivity, a handheld device with a wireless connection function, or another processing device connected to a wireless modem. The terminal device may alternatively be a wireless terminal. The wireless terminal may communicate with one or more core networks by using an access network (AN). The wireless terminal may be a mobile terminal, such as a mobile phone (also referred to as a "cellular" phone) and a computer with a mobile terminal. The computer with a mobile terminal, for example, may be a portable, pocket-sized, handheld, computer built-in, or vehicle-mounted mobile apparatus, which exchanges voice and/or data with the radio access network. For example, the wireless terminal may further be a device such as a personal communication service (PCS) phone, a cordless telephone set, a session initiation protocol (SIP) phone, a wireless local loop (WLL) station, or a personal digital assistant (PDA). The wireless terminal may also be called a system, a subscriber unit, a subscriber station, a mobile station, a mobile console (Mobile), a remote station, an access point, a remote terminal device (Remote Terminal), an access terminal device (Access Terminal), a user terminal device (User Terminal), a user agent, a user device, or user equipment (UE).

FIG. 1 is a schematic diagram of a next generation mobile network system architecture. A control plane and a forwarding plane in the next generation mobile network architecture are separated, to decouple a control plane function from a forwarding plane function of a mobile gateway, decomposing a unified control plane network element (Control Plane, CP) into a session management function (SMF) entity and an access and mobility management function (AMF) entity. For example, the system architecture includes: a terminal, an access network (AN), a data network (DN), an SMF, and an AMF. When the terminal is in an active state, there is an NG1 signaling connection between the AMF and the terminal. A wireless connection exists between the terminal and the AN. The wireless connection includes an RRC signaling connection and a user plane connection, and the user plane connection may be a radio bearer (RB). An NG2 signaling connection exists between the AMF and the AN. An NG3 signaling connection exists between the AN and a User Plane Function (UPF). An NG4 signaling connection exists between the SMF and a UPF. An NG6 signaling connection exists between the UPF and the DN. An NG11 signaling connection exists between the AMF and the SMF.

The AMF is responsible for attachment, mobility management, a tracking area update procedure, and the like of the terminal.

The SMF is responsible for session management of the terminal, user plane (UP) network element selection, UP network element reselection, IP address assignment, bearer establishment, modification, and release, QoS control, and the like.

The AN provides a wireless access service for the terminal. The AN may include various base stations such as a macro base station, a micro base station (also referred to as a small cell), a relay station, and an access point. In systems using different wireless access technologies, a device having a base station function may have different names For example, in an LTE system, the device is referred to as an evolved NodeB (eNB or eNodeB). In a third generation (3G) system, the device is referred to as a NodeB (Node B). In a 5G system, the device is referred to as a new base station (gNodeB, gNB). This is not limited in this embodiment of this application.

The DN may be used to provide a data transmission service for the terminal.

The terminal includes but is not limited to a mobile phone, a network access terminal device, an internet of things terminal device, and the like.

Figure 2:
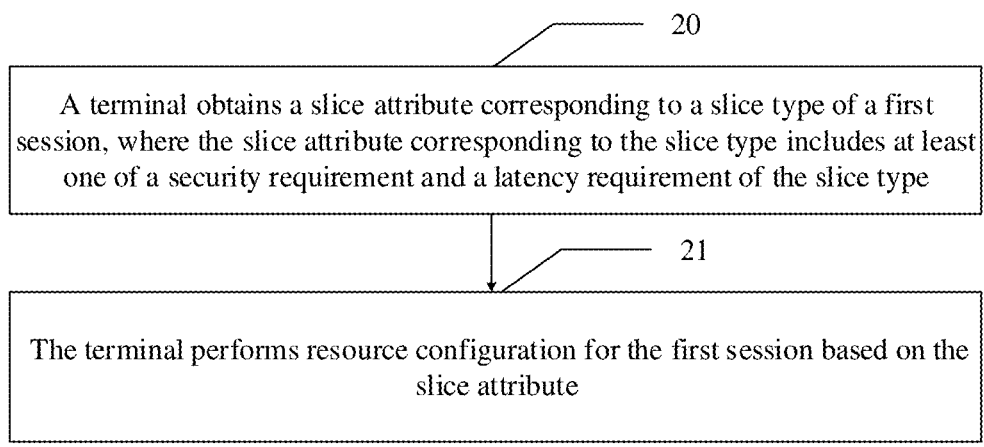
FIG. 2 is a flowchart of a resource configuration method according to an embodiment of this application.

Based on the schematic diagram of the network system architecture shown in FIG. 1, FIG. 2 is a schematic flowchart of a resource configuration method according to an embodiment of this application. The procedure may be specifically implemented by using hardware, software programming, or a combination of software and hardware.

The terminal may be configured to perform the procedure shown in FIG. 2, a functional module, in the terminal, configured to perform the resource configuration solution provided in this embodiment of this application may be specifically implemented by hardware, software programming, or a combination of software and hardware, and the hardware may include one or more signal processing and/or application-specific integrated circuits.

As shown in FIG. 2, the procedure specifically includes the following processing processes.

Step 20: The terminal obtains a slice attribute corresponding to a slice type of a first session, where the slice attribute corresponding to the slice type includes at least one of a security requirement or a latency requirement of the slice type.

Step 21: The terminal performs resource configuration for the first session based on the slice attribute.

For example, in step 20, the obtaining, by the terminal, a slice attribute corresponding to a slice type of a first session includes the following two implementations:

A first implementation: The terminal sends a session establishment request message to a control plane network element, and receives a session establishment accept message from the control plane network element, where the session establishment accept message carries the slice type of the first session; and the terminal obtains, based on a mapping relationship that is between each slice type and each slice attribute and that is locally stored in the terminal, the slice attribute corresponding to the slice type of the first session. The slice attribute includes at least one of the security requirement or the latency requirement that correspond to the slice type.

In this implementation, the terminal preconfigures the mapping relationship between each slice type (namely, S-NSSAI) and each slice attribute. In this case, the slice attribute includes either or both of the security requirement and the latency requirement. The terminal receives, after session establishment is completed, the session establishment accept message sent by the control plane network element. The session establishment accept message carries the S-NSSAI corresponding to the slice type of the first session, to trigger the terminal to obtain, based on the locally stored mapping relationship between each piece of S-NSSAI and each slice attribute, the slice attribute corresponding to the slice type of the first session. For example, the terminal obtains, in the foregoing manner, at least one of the security requirement or the latency requirement that correspond to the slice type of the first session. In this way, after the session establishment is completed, the terminal determines, based on the security requirement corresponding to the S-NSSAI of the first session, whether to provide an isolated resource for the first session, thereby ensuring security isolation of an end-to-end network slice. In addition, the terminal may generate a task scheduling policy based on the latency requirement corresponding to the S-NSSAI of the first session, to determine whether high-priority resource scheduling needs to be provided for the first session, thereby ensuring latency of the end-to-end network slice.

A second implementation: The terminal sends a session establishment request message to a control plane network element, and receives a session establishment accept message from the control plane network element, where the session establishment accept message carries the slice type of the first session and the slice attribute corresponding to the slice type. For example, the slice attribute carried in the session establishment accept message is the security requirement corresponding to the slice type.

In this implementation, the terminal sends the session establishment request message to the control plane network element in a session establishment process, where the session establishment request message carries the S-NSSAI corresponding to the slice type of the first session; and receives, in the session establishment process, the S-NSSAI corresponding to the slice type and the security requirement corresponding to the slice type that are returned by the control plane network element. Optionally, the security requirement may be security isolation indication information corresponding to the slice type. The terminal may determine, based on the security isolation indication information, whether to provide an isolated resource for the first session, thereby ensuring security isolation of the end-to-end network slice.

Further, the terminal triggers, based on the S-NSSAI that corresponds to the slice type of the first session and that is carried in the session establishment accept message, the terminal to obtain, based on the locally stored mapping relationship between each piece of S-NSSAI and each slice attribute, the slice attribute corresponding to the slice type of the first session. The slice attribute herein is the latency requirement of the slice.

With reference to the second implementation, the terminal may trigger, based on the slice type carried in a first session accept message and the security requirement corresponding to the slice type, the terminal to determine, based on the security isolation indication information, whether to provide the isolated resource for the first session. In addition, optionally, the terminal may determine, based on the slice type carried in the first session accept message and the locally stored mapping relationship between each slice type and each latency requirement, the latency requirement corresponding to the slice type of the first session. That is, the terminal comprehensively determines, in the foregoing implementation, the slice attribute corresponding to the slice type of the first session.

With reference to the first and the second implementations, the slice attribute that corresponds to the slice type of the first session and that is obtained by the terminal includes at least one of the security requirement or the latency requirement of the slice type.

In a possible implementation, the slice attribute obtained by the terminal may include both the security requirement and the latency requirement of the slice type, and the terminal performs resource configuration for the first session based on both the security requirement and the latency requirement of the slice type. To be specific, the terminal determines, based on a security attribute of the slice type, whether the isolated resource needs to be provided for the first session; and in addition, the terminal determines, based on the latency requirement of the slice type, whether the high-priority resource scheduling needs to be provided for the first session.

In another possible implementation, the slice attribute obtained by the terminal may include only one of the security requirement and the latency requirement of the slice type. Further, if the slice attribute obtained by the terminal includes only the security requirement of the slice type, the terminal determines, based on the security requirement of the slice type, whether the isolated resource needs to be provided for the first session. If the slice attribute obtained by the terminal includes only the latency requirement of the slice type, the terminal determines, based on the latency requirement of the slice type, whether high-priority resource scheduling needs to be provided for the first session.

In combination with the foregoing implementations, when the terminal implements resource configuration by using the security requirement and the latency requirement, the two requirements are independent of each other, and do not affect each other.

Specifically, when performing resource configuration for the first session based on the slice attribute, the terminal performs resource configuration for the first session based on related information included in the slice attribute. Further, during specific implementation, if the slice attribute includes the security requirement of the slice type, the terminal determines, based on the security requirement of the slice type, whether to provide the isolated resource for the first session.

Optionally, the security requirement may be represented by using security isolation indication information, and the security isolation indication information indicates a security isolation attribute. If the security isolation indication information indicates that the terminal needs to provide the isolated resource for the first session, the following manner may be used for implementation:

If the security isolation attribute is indicated as strong, the terminal may perform security hardware protection, for example, a built-in encrypted chip, an encryption process is completed in the chip, and sensitive security data may be separately stored and independently operated, to implement hardware protection.

If the security isolation attribute is indicated as medium, the terminal may provide security isolation for the first session by using a physically independent operating system (OS).

If the security isolation attribute is indicated as weak, the terminal may allocate, based on a shared OS, an independent central processing unit (CPU) to the first session and provide an isolated process group. For example, isolated process groups use different namespaces to achieve an isolation purpose, and different process groups have respective processes, networks, and the like.

If the slice attribute includes the latency requirement of the slice type, the terminal determines, based on the latency requirement of the slice type, whether to provide the high-priority resource scheduling for the first session. It should be noted that the high priority in embodiments of this application means that a priority is higher than a preset value. For example, for a session having a low latency requirement, the terminal may use a real-time operating system to set a high process priority, and provide a timely response and high reliability. For a session having no latency requirement, the terminal may use a non-real-time operating system to set a low process priority, and provide a lightweight computing capability. It should be noted that, the session having a low latency requirement is a session having an extremely high requirement for quality of service (QoS). For example, a requirement for a service such as latency, latency jitter, or a packet loss rate is usually less than a preset value. The session having no latency requirement is a session having no extremely high requirement for quality of service (QoS). For example, a requirement for a service such as latency, latency jitter, or a packet loss rate is usually greater than or equal to a preset value. For example, in FIG. 3, the terminal currently accesses network slices corresponding to two different slice types, which are an enhanced mobile broadband (eMBB) slice and an internet of vehicles (vehicle to X, V2X) slice. For example, the eMBB slice may be specific to a high-bandwidth low-latency service, such as a high-definition video service or a virtual reality/augmented reality service. Specifically, Table 1 shows requirement indexes of eMBB services, and Table 2 shows a requirement index of a V2X service.

TABLE 1

Enhanced mobile broadband service

| Requirement category | Scenario example | Bandwidth | Latency | Moving speed |
|---|---|---|---|---|
| Enhanced mobile broadband service | Enhanced video (UHD/ holographic, virtual & augmented reality) | Downlink: 1 Gbps Uplink: 500 Mbps | 10 ms | Walking speed |
| | High-speed train | Downlink: 50 Mbps Uplink: 25 Mbps | 10 ms | Highest: 500 km/h |
| | 3D connection: flight vehicle | Downlink: 15 Mbps Uplink: 7.5 Mbps | 10 ms | Highest: 1000 km/h |
| | Ultra-low cost network (covering population in backward areas) | Downlink: 10 Mbps Uplink: 10 Mbps | 50 ms | 0-50 km/h |
| | Anytime and anywhere 50 Mbps (lowest service requirement) | Downlink: 50 Mbps Uplink: 25 Mbps | 10 ms | 0-120 km/h |

The V2X slice may be specific to a service that is extremely sensitive to latency, for example, a service such as assistant driving/self-driving. Packet loss rate of the V2X services $<10^{-5}$, jitter $<\mu s$, and has 1 ms of end-to-end latency.

TABLE 2

Internet of vehicles service

| Requirement category | Scenario example | Bandwidth | Latency | Moving speed |
|---|---|---|---|---|
| Internet of vehicles service | Automatic traffic control/automatic driving | Downlink: 50 kbps to 10 Mbps Uplink: 20 kbps to 10 Mbps | 1 ms | 0-500 km/h |

It can be learned from Table 1 and Table 2 that network slices of the two different slice types need different types of network features and performance requirements, for example, mobility, security, a policy, latency, and reliability.

Figure 3:
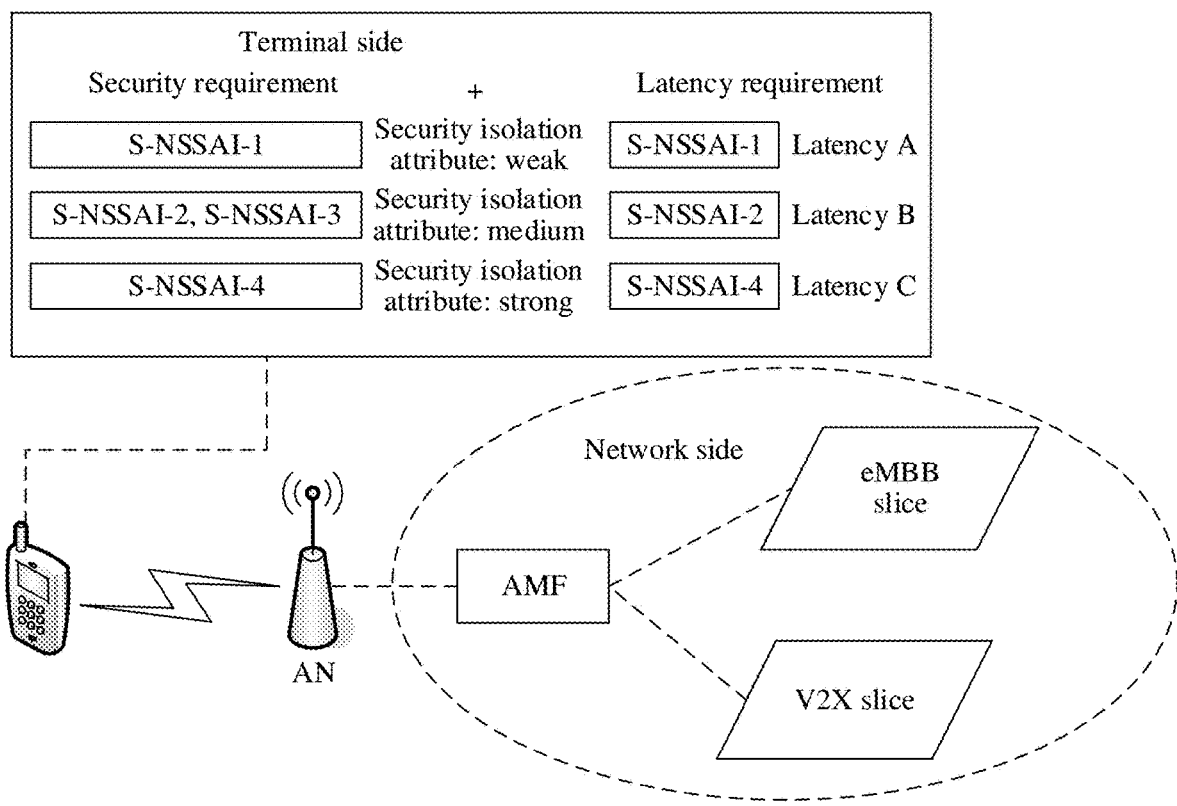
FIG. 3 is a schematic diagram of a resource configuration application according to an embodiment of this application.

It can be learned from FIG. 3 that, when initiating a session request, the terminal can obtain a security requirement and a latency requirement of a network slice of the session. For example, a security isolation attribute and a latency requirement of a network slice corresponding to a network slice type may be obtained based on the slice type of the network slice, so as to perform session resource configuration based on the security isolation attribute and the latency requirement of the network slice.

For example, a slice type corresponding to the eMBB slice is S-NSSAI-1. When the terminal initiates a session establishment request of a first session, and accesses the eMBB slice to use a high-definition video service, if a control plane network element indicates that a security isolation attribute of the eMBB slice that corresponds to the S-NSSAI-1 is relatively low or it is found, by using configuration information locally stored in the terminal, that a security isolation attribute of the eMBB slice that corresponds to the S-NSSAI-1 is relatively low, the terminal may perform resource isolation for the first session by using a shared OS. It is found, by using the configuration information locally stored in the terminal, that a latency requirement corresponding to the eMBB slice that corresponds to the S-NSSAI-1 is latency A. It is further determined that the eMBB slice can provide a service for a service having no latency requirement, and while using the shared OS to perform resource isolation, the terminal may further use a real-time operating system, set a high process priority, and provide a timely response and high reliability.

Similarly, a slice type corresponding to the V2X slice is S-NSSAI-4. When the terminal initiates a session establishment request of a first session, and accesses the V2X slice to use a self-driving service, if a control plane network element indicates that a security isolation attribute of the V2X slice that corresponds to the S-NSSAI-4 is relatively strong or it is found, by using configuration information locally stored in the terminal, that a security isolation attribute of the V2X slice that corresponds to the S-NSSAI-4 is relatively strong, the terminal may use a physically independent OS to prevent data leakage and ensure personal data security. It is found, by using the configuration information locally stored in the terminal, that a latency requirement of the V2X slice that corresponds to the S-NSSAI-4 is a low latency requirement. While performing security hardware protection, the terminal may further use a real-time operating system, set a high process priority, and provide a timely response and high reliability.

By using the foregoing implementation method, the terminal implements, based on the slice attribute corresponding to the slice type, that is, at least one of the security requirement or the latency requirement, slice type-based resource isolation and/or priority resource scheduling, thereby providing differentiated security protection and resource configuration. Therefore, data security of an application on the terminal is ensured, and not only latency, reliability, and security requirements of the application can be met, but also a terminal resource can be effectively used, to ensure an end-to-end service-level agreement (SLA).

Based on the network architecture shown in FIG. 1, the following describes the foregoing method in detail by using three embodiments.

Embodiment 1

Figure 4:
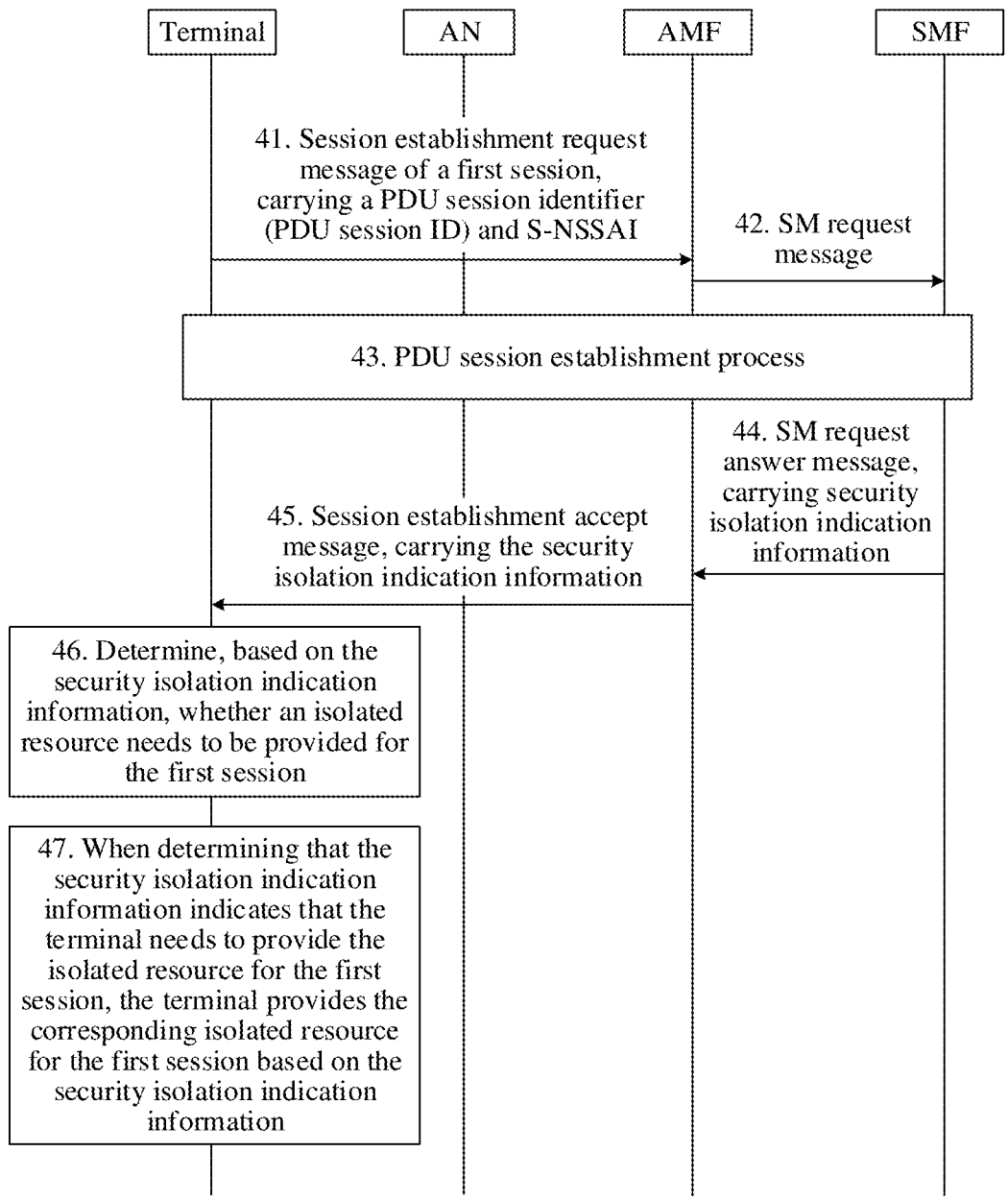
FIG. 4 is a flowchart of a resource configuration method according to an Embodiment 1 of this application.

In the technical solution in Embodiment 1, a terminal receives, in a session establishment process of a first session, a security requirement that is of the first session and that is returned by a control plane network element, to trigger the terminal to perform resource isolation on the terminal side based on the security requirement. Specifically, the control plane network element determines, based on a service type requested by the terminal, the security requirement of a network slice associated with the first session; in a session establishment accept message, the control plane network element returns the security requirement corresponding to the first session; and after receiving the security requirement of the first session, the terminal determines whether an isolated resource needs to be provided for the first session. A specific process is shown in FIG. 4.

Step 41: The terminal initiates, to an AMF by using an AN, a session establishment request message for a first session of a first application, where the session establishment request message carries a session identifier (a Packet Data Unit (PDU) session ID) allocated to the first session and a slice type to which the first application is mapped based on an NSSP, and the slice type is represented by S-NSSAI.

It should be noted that before step 41 is performed, a network slice selection policy (NSSP) of each PLMN network is preconfigured on the terminal.

In a possible implementation, the network slice selection policy includes a mapping rule between an application and a slice type. When the terminal needs to initiate a session establishment request of an application, the session establishment request message carries S-NSSAI to which the application is mapped based on the NSSP.

Further, the network slice selection policy may indicate the mapping rule between an application and a slice type by using Table 3. For example, an NSSP rule 1 in Table 3 represents that S-NSSAI to which an application A1, an application A2, . . . , and an application An are mapped is S-NSSAI-1, and meanings of other NSSP rules are similar. It should be noted that this is merely an example for description, and is not limited in embodiments of this application.

TABLE 3

| NSSP rule 1 | Applications A1 to An | S-NSSAI-1 |
| NSSP rule 2 | Applications B1 to Bn | S-NSSAI-2 |

TABLE 3-continued

| NSSP rule 3 | Applications C1 to Cn | S-NSSAI-3 |
| NSSP rule 4 | Applications D1 to Dn | S-NSSAI-4 |
| ... | ... | ... |

Step 42: After receiving the session establishment request message of the terminal, an AMF selects an SMF based on the S-NSSAI carried in the session establishment request message. The SMF belongs to a network slice corresponding to the S-NSSAI, and the AMF sends a session management (SM) request message to the SMF. The session management request message carries a permanent identifier (Subscriber Permanent Identifier, SUPI) of the terminal, the session identifier (PDU session ID) of the first session, and the S-NSSAI.

Step 43: The SMF performs a PDU session establishment process with the terminal, including that the SMF selects a UPF network element for the terminal, assigns an IP address to the terminal, and so on.

Step 44: The SMF returns an SM request answer message to the AMF, where the SM request answer message carries a permanent identifier SUPI of the terminal, the PDU session ID of the first session, the S-NSSAI, and security isolation indication information corresponding to the slice type identified by the S-NSSAI.

It should be noted that in this embodiment, the security isolation indication information is used to represent the security requirement, and the security isolation indication information is used to indicate a security isolation attribute. Optionally, the security isolation indication information may use strong, medium, or weak to represent a corresponding security isolation attribute. The security isolation attribute may be indicated in another manner. This is not specifically limited in embodiments of this application.

Step 45: The AMF returns a session establishment accept message to the terminal by using the AN, where the session establishment accept message carries the PDU session ID of the first session, the S-NSSAI, and the security isolation indication information corresponding to the slice type identified by the S-NSSAI.

Step 46: After receiving the session establishment accept message returned by the AMF, the terminal determines, based on the security isolation indication information carried in the session establishment accept message, whether an isolated resource needs to be provided for the first session. The security isolation indication information indicates a security isolation attribute that is of the first session and that is associated with the S-NSSAI.

It should be understood that the security isolation indication information is further used to indicate a resource isolation requirement of the first session of the terminal, that is, indicate whether the isolated resource needs to be provided for the first session.

Step 47: When determining that the security isolation indication information indicates that the terminal needs to provide the isolated resource for the first session, the terminal provides the corresponding isolated resource for the first session based on the security isolation indication information.

In certain example implementations, the terminal may preconfigure a resource isolation manner corresponding to each security isolation attribute.

Specifically, in a possible implementation, if a security isolation attribute in the security isolation indication information is indicated as strong, the terminal may provide the isolated resource for the first session through security hardware protection. For example, the security hardware protection may be implemented by using a built-in encrypted chip, each encryption process is completed in the encrypted chip, and all sensitive secure data can be stored separately and operated independently, thereby implementing the hardware protection.

In a possible implementation, if a security isolation attribute in the security isolation indication information is indicated as medium, the terminal may provide the isolated resource for the first session by using a physically independent OS, and subsequently, a data stream of the first application is transmitted to a core network by using the first session.

In a possible implementation, if a security isolation attribute in the security isolation indication information is indicated as weak, the terminal may allocate, based on a shared OS, an independent CPU to the first session, and provide an isolation process group to provide the isolated resource for the first session. Subsequently, the data stream of the first application is transmitted to the core network by using the first session.

Figure 5:
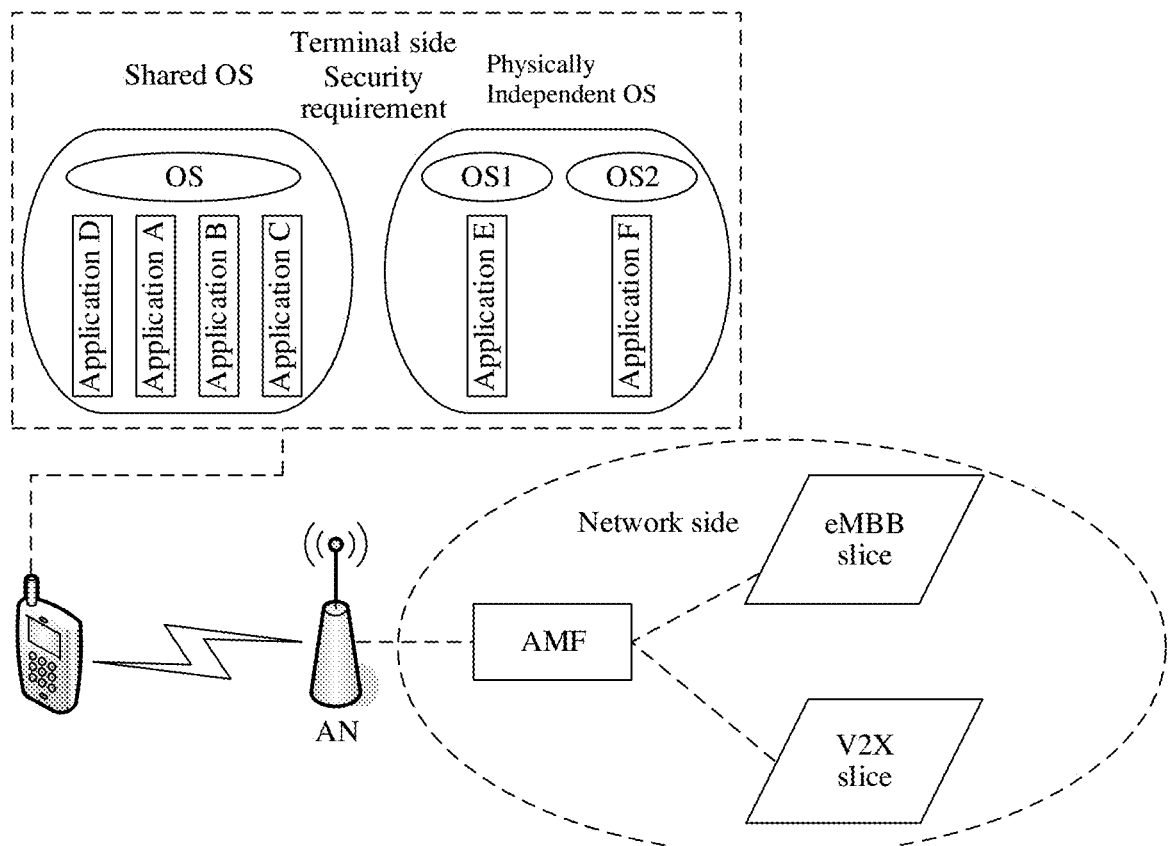
FIG. 5 is a schematic diagram of a resource configuration application according to the Embodiment 1 of this application.

For example, as shown in FIG. 5, the terminal currently accesses network slices corresponding to two different slice types: an eMBB slice and a V2X slice. When the terminal needs to use a high-definition video service, the terminal initiates a session establishment request to access the eMBB slice. If the control plane network element AMF indicates to the terminal that a security isolation attribute of the eMBB slice is weak, the terminal may provide the isolated resource for the first session by using the shared OS.

Similarly, when the terminal needs to use a self-driving service, the terminal initiates a session establishment request to access the V2X slice. If the control plane network element AMF indicates to the terminal that a security isolation attribute of the V2X slice is medium, the terminal may prevent data leakage by using the physically independent OS, to ensure personal data security.

In FIG. 5, each of an application A, an application B, an application C and an application D on a terminal side uses the eMBB slice. If a network indicates that the security isolation attribute of the eMBB slice is weak, a session associated with these applications uses a shared OS mechanism. Both an application E and an application F on the terminal side use V2X slices. If the network indicates that the security isolation attribute of the eMBB slice is medium, the terminal may virtualize an independent OS-1 for a session resource of the application E, and both a session and data of the application E are protected on the OS-1. In addition, the terminal virtualizes another independent OS-2 for a session resource of the application F, and both the session and data of the application F are protected on the OS-2. In this case, the data of both the application E and the application F is not accessed by an application in another slice, to ensure resource isolation.

In the technical solution in Embodiment 1 of this application, the terminal receives, in a session establishment process of the first session, the security requirement that is of the network slice type associated with the first session and that is returned by the control plane network element, to trigger the terminal to determine, based on the security requirement, whether to perform resource isolation on the terminal side, thereby ensuring security of an end-to-end network slice.

Embodiment 2

A general procedure in Embodiment 2 is similar to that in Embodiment 1. A difference lies in that in Embodiment 2, a terminal locally configures a security requirement corresponding to each network slice type (S-NSSAI).

Specifically, when the terminal locally configures the security requirement corresponding to each network slice type, in a possible implementation, a dimension is added to an original NSSP locally stored in the terminal, to add a security requirement of a slice type that corresponds to the S-NSSAI. Optionally, the security requirement may be represented by using a security isolation attribute. In this embodiment of this application, the security isolation attribute is represented by using strong, medium, or weak. For details, refer to Table 4. For example, an NSSP rule 1 in Table 4 represents that S-NSSAI to which an application A1, an application A2, . . . , and an application An are mapped is S-NSSAI-1, security isolation attributes are all weak, and meanings of other NSSP rules are similar.

TABLE 4

| NSSP rule 1 | Applications A1 to An | S-NSSAI-1 | Security isolation attribute: weak |
|---|---|---|---|
| NSSP rule 2 | Applications B1 to Bn | S-NSSAI-2 | Security isolation attribute: medium |
| NSSP rule 3 | Applications C1 to Cn | S-NSSAI-3 | Security isolation attribute: medium |
| NSSP rule 4 | Applications D1 to Dn | S-NSSAI-4 | Security isolation attribute: strong |
| . . . | . . . | . . . | . . . |

When the terminal locally configures the security requirement corresponding to each network slice type, in another possible implementation, the terminal locally directly configures a list of different security requirements. The list includes network slice types, that is, S-NSSAI included in the different security requirements. Optionally, the security requirement may be represented by using a security isolation attribute. In this embodiment of this application, the security isolation attribute is represented by using strong, medium, or weak. For details, refer to Table 5. For example, Table 5A stores S-NSSAI corresponding to a slice whose security isolation attribute is weak. If a security isolation attribute corresponding to the S-NSSAI-1 is weak, a network slice type stored in Table 5A is the S-NSSAI-1. Table 5B stores S-NSSAI corresponding to a slice whose security isolation attribute is medium. If security isolation attributes corresponding to the S-NSSAI-2 and the S-NSSAI-3 are medium, network slice types stored in Table 5B are the S-NSSAI-2 and the S-NSSAI-3. Table 5C stores S-NSSAI corresponding to a slice whose security isolation attribute is strong. If a security isolation attribute corresponding to the S-NSSAI-4 is strong, a network slice type stored in Table 5C is the S-NSSAI-4. It should be noted that Table 5-A, Table 5-B, and Table 5-C are merely used to distinguish different security requirement lists. This is not limited in embodiments of this application.

TABLE 5

| Security isolation attribute: weak | Table 5-A |
| Security isolation attribute: medium | Table 5-B |
| Security isolation attribute: strong | Table 5-C |

Figure 6:
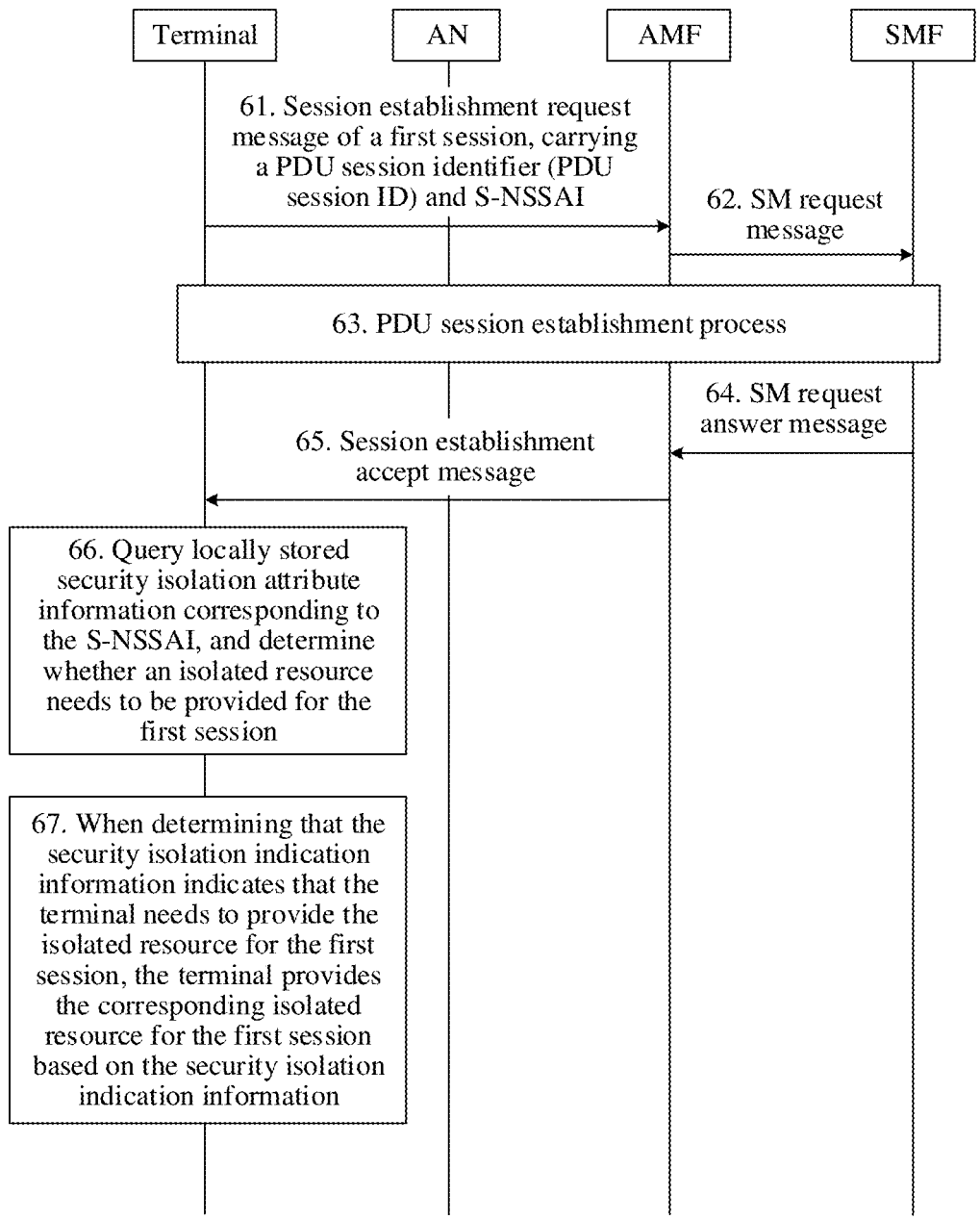
FIG. 6 is a flowchart of a resource configuration method according to an Embodiment 2 of this application.

Further, the terminal carries a session establishment request of initiating a first session by the S-NSSAI, and after the session is successfully established, the terminal determines, based on security isolation attribute information of the S-NSSAI, whether an isolated resource needs to be allocated to the first session. An example procedure is shown in FIG. 6.

Step 61: The terminal initiates, to an AMF by using an AN, a session establishment request message for a first session of a first application, where the session establishment request message carries a session identifier (PDU session ID) allocated to the first session and a slice type to which the first application is mapped based on an NSSP, and the slice type is represented by S-NSSAI.

Step 62: After receiving the session establishment request message of the terminal, the AMF selects an SMF based on the S-NSSAI carried in the session establishment request message. The SMF belongs to a network slice corresponding to the S-NSSAI, and the AMF sends an SM request message to the SME The SM request message carries an SUPI of the terminal, the PDU session ID of the first session, and the S-NSSAI.

Step 63: The SMF performs a PDU session establishment process with the terminal, including that the SMF selects a UPF network element for the terminal, assigns an IP address to the terminal, and so on.

Step 64: The SMF returns an SM request answer message to the AMF, where the SM request answer message carries the SUPI of the terminal, the PDU session ID of the first session, and the S-NSSAI.

Step 65: The AMF returns a session establishment accept message to the terminal by using the AN, where the session establishment accept message carries the session identifier of the first session and the S-NSSAI.

Step 66: The terminal receives the session establishment accept message returned by the AMF, and the first session is successfully established. The terminal queries, based on S-NSSAI associated with the first session, locally stored security isolation attribute information corresponding to the S-NSSAI, and determines whether an isolated resource needs to be provided for the first session.

For example, if the S-NSSAI associated with the first session is S-NSSAI-1, and a security requirement list configured by the terminal is shown in Table 4, the terminal queries, in Table 4, the security isolation attribute information corresponding to the S-NSSAI-1, and finds that a security isolation attribute corresponding to the S-NSSAI-1 is weak. Similarly, if the security requirement list configured by the terminal is shown in Table 5, the terminal sequentially queries Table 5-A, Table 5-B, and Table 5-C to determine whether the security isolation attribute information corresponding to the S-NSSAI-1 exists, and ends the query when finding the security isolation attribute corresponding to the S-NSSAI-1. In this case, in Table 5-A, it is found that the security isolation attribute corresponding to the S-NSSAI-1 is weak.

It should be noted that in this embodiment, security isolation indication information is used to represent the security requirement, and the security isolation indication information is used to indicate the security isolation attribute. Optionally, the security isolation indication information may use strong, medium, or weak to represent a corresponding security isolation attribute. The security isolation attribute may be indicated in another manner. This is not specifically limited in embodiments of this application.

It should be understood that the security isolation indication information is further used to indicate a resource isolation requirement of the first session of the terminal, that is, indicate whether the isolated resource needs to be provided for the first session.

Step 67: When determining that the security isolation indication information indicates that the terminal needs to provide the isolated resource for the first session, the terminal provides the corresponding isolated resource for the first session based on the security isolation indication information.

In certain example implementations of step 67, refer to corresponding implementations in step 47.

In the technical solution in Embodiment 2 of this application, the terminal locally configures the security requirement corresponding to each network slice type. After the session establishment of the first session is completed, the terminal determines, based on the security requirement corresponding to the S-NSSAI associated with the first session, whether to provide the isolated resource for the first session, thereby ensuring security of an end-to-end network slice.

Embodiment 3

In the technical solution in Embodiment 3, to ensure latency of a network side slice on a terminal side, a terminal locally configures a latency requirement corresponding to each network slice type (S-NSSAI).

Specifically, when the terminal locally configures the latency requirement corresponding to each network slice type, in a possible implementation, a dimension is added to an original NSSP locally stored in the terminal, to add a latency requirement of a slice type that corresponds to the S-NSSAI. For example, an NSSP rule 1 in Table 6 represents that S-NSSAI to which an application A1, an application A2, ..., and an application An are mapped is S-NSSAI-1, duration of the latency requirement is A, and meanings of other NSSP rules are similar. For details, refer to Table 6.

TABLE 6

| NSSP rule 1 | Applications A1 to An | S-NSSAI-1 | Latency A |
| NSSP rule 2 | Applications B1 to Bn | S-NSSAI-2 | Latency B |
| NSSP rule 3 | Applications C1 to Cn | S-NSSAI-3 | Latency B |
| NSSP rule 4 | Applications D1 to Dn | S-NSSAI-4 | Latency C |
| ... | ... | ... | ... |

When the terminal locally configures the latency requirement corresponding to each network slice type, in another possible implementation, the terminal locally directly configures an S-NSSAI list having different latency requirements. The list includes S-NSSAI corresponding to different latency requirements. As shown in Table 7, for example, Table 7-A stores S-NSSAI corresponding to a slice whose latency requirement is W. If a latency requirement corresponding to S-NSSAI-1 is W, a network slice type stored in Table 7-A is the S-NSSAI-1. Table 7-B stores S-NSSAI corresponding to a slice whose latency requirement is Y. If latency requirements corresponding to S-NSSAI-2 and S-NSSAI-3 are Y, network slice types stored in Table 7-B are the S-NSSAI-2 and the S-NSSAI-3. Table 7-C stores S-NS-SAI corresponding to a slice whose latency requirement is Z. If a latency requirement corresponding to S-NSSAI-4 is Z, a network slice type stored in Table 7-C is the S-NSSAI-4. It should be noted that Table 7-A, Table 7-B, and Table 7-C are merely used to distinguish between different latency requirement lists. This is not limited in embodiments of this application.

TABLE 7

| Latency requirement: W | Table 7-A |
| Latency requirement: Y | Table 7-B |
| Latency requirement: Z | Table 7-C |

Figure 7:
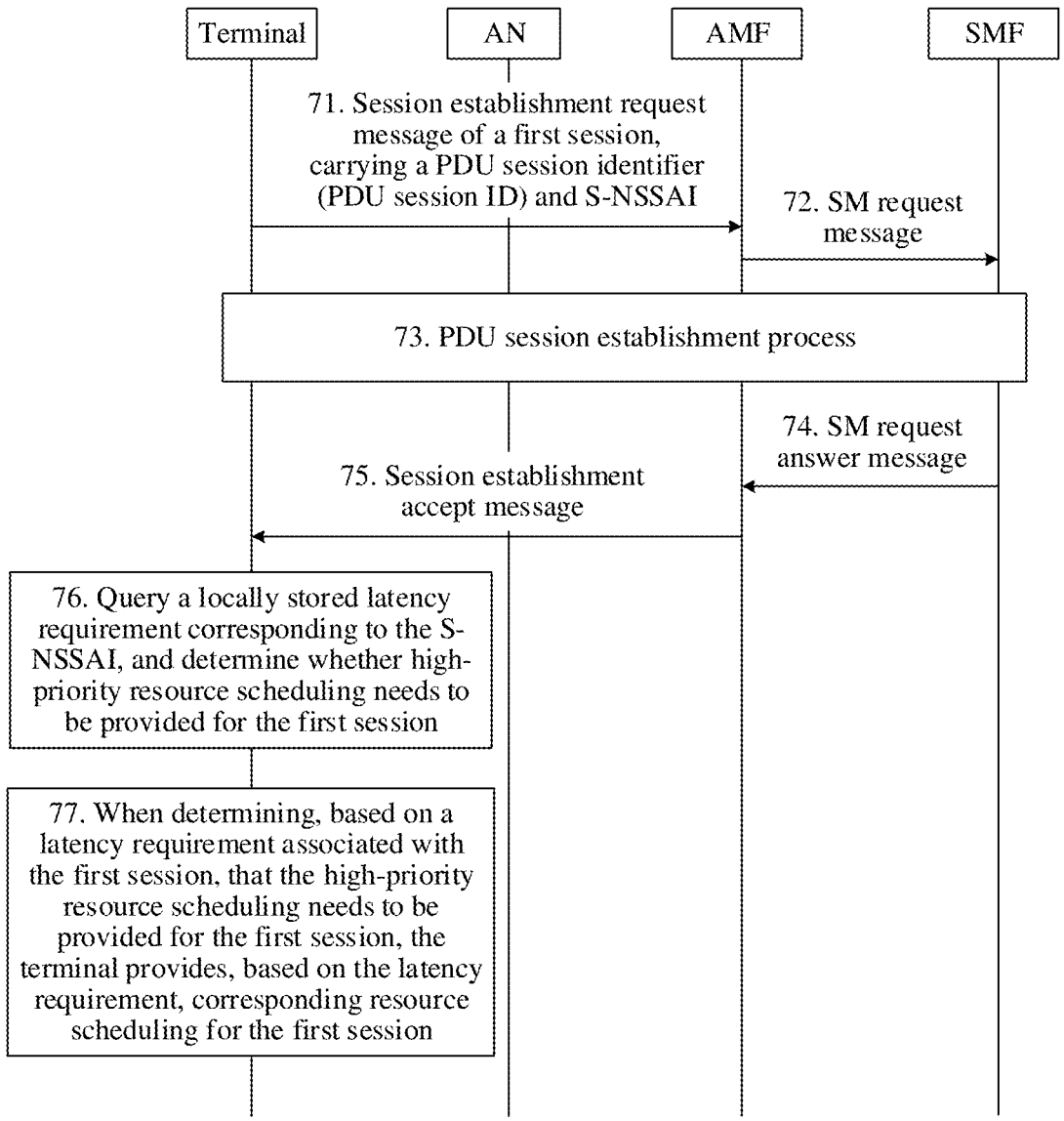
FIG. 7 is a flowchart of a resource configuration method according to an Embodiment 3 of this application.

Further, the terminal carries a session establishment request of initiating a first session by the S-NSSAI, and after the session is successfully established, the terminal determines, based on a locally configured latency requirement of the S-NSSAI, whether high-priority resource scheduling needs to be provided for the first session. A specific process is shown in FIG. 7.

Step 71: The terminal initiates, to an AMF by using an AN, a session establishment request message for a first session of a first application, where the session establishment request message carries a session identifier (PDU session ID) allocated to the first session and a slice type to which the first application is mapped based on an NSSP, and the slice type is represented by S-NSSAI.

Step 72: After receiving the session establishment request message of the terminal, the AMF selects an SMF based on the S-NSSAI carried in the session establishment request message. The SMF belongs to a network slice corresponding to the S-NSSAI, and the AMF sends an SM request message to the SME The SM request message carries an SUPI of the terminal, the PDU session ID of the first session, and the S-NSSAI.

Step 73: The SMF performs a PDU session establishment process with the terminal, including that the SMF selects a UPF network element for the terminal, assigns an IP address to the terminal, and so on.

Step 74: The SMF returns an SM request answer message to the AMF, where the SM request answer message carries a permanent identifier SUPI of the terminal, the PDU session ID of the first session, and the S-NSSAI.

Step 75: The AMF returns a session establishment accept message to the terminal by using the AN, where the session establishment accept message carries the session identifier of the first session and the S-NSSAI.

Step 76: The terminal receives the session establishment accept message returned by the AMF, which represents that the first session is successfully established.

The terminal queries, based on S-NSSAI associated with the first session, a locally stored latency requirement corresponding to the S-NSSAI, and determines whether high-priority resource scheduling needs to be provided for the first session.

In certain example implementations, if the latency requirement corresponding to the S-NSSAI is less than a preset value, the first session is determined as a session having a low latency requirement; and if the latency requirement corresponding to the S-NSSAI is not less than the preset value, the first session is determined as a session having no latency requirement.

Step 77: When determining, based on a latency requirement associated with the first session that the high-priority resource scheduling needs to be provided for the first session, the terminal provides, based on the latency requirement, corresponding resource scheduling for the first session.

Specifically, the terminal correspondingly sets different resource scheduling policies for sessions having different latency requirements.

In a possible implementation, if the first session is a session having a low latency requirement, for example, a session of an ultra-reliable low-latency communication (URLLC) service, the resource scheduling policy provided by the terminal is as follows: A real-time operating system is used to set a high process priority, and provide a timely response and high reliability. If the first session is a session having no latency requirement, for example, a session of a sensor measurement service or a small packet transmission service, the resource scheduling policy provided by the terminal is as follows: A non-real-time operating system is used to set a low process priority, and provide a lightweight computing capability.

Figure 8:
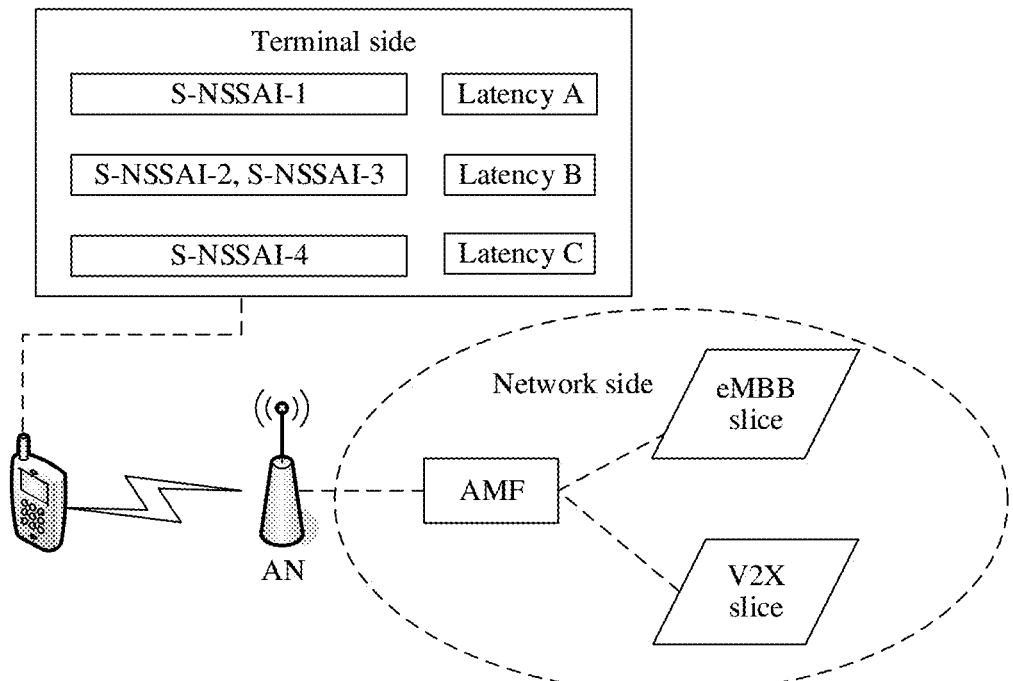
FIG. 8 is a schematic diagram of a resource configuration application according to the Embodiment 3 of this application.

For example, as shown in FIG. 8, the terminal currently accesses network slices corresponding to two different slice types: an eMBB slice and a V2X slice. When the terminal needs to use a high-definition video service, the terminal initiates a session establishment request to access the eMBB slice. If a slice type corresponding to the eMBB slice is S-NSSAI-2, the terminal obtains that a latency requirement corresponding to the S-NSSAI-2 is W, and determines that a latency requirement corresponding to the eMBB slice is a low latency requirement. The terminal may use a real-time operating system, to set a high process priority, and provide a timely response and high reliability.

Similarly, when the terminal needs to use a self-driving service, the terminal initiates a session establishment request to access the V2X slice. If a slice type corresponding to the V2X slice is S-NSSAI-3, the terminal obtains that a latency requirement corresponding to the S-NSSAI-3 is W, and determines that a latency requirement corresponding to the V2X slice is a low latency requirement. The terminal may use a real-time operating system, to set a high process priority, and provide a timely response and high reliability.

In the technical solution in Embodiment 3 of this application, the terminal locally configures the latency requirement corresponding to each piece of S-NSSAI. After the session establishment is completed, the terminal generates the resource scheduling policy based on the latency requirement corresponding to the S-NSSAI of the session, and determines whether the high-priority resource scheduling needs to be provided for the session, thereby ensuring latency of an end-to-end network slice.

It should be noted that, the technical solution in Embodiment 2 may be used in combination with the technical solution in Embodiment 3. In this case, the terminal locally configures the security requirement and the latency requirement that correspond to each piece of S-NSSAI. For a specific configuration method, refer to the foregoing embodiments. After the session establishment is completed, the terminal queries, based on the S-NSSAI associated with the session, the security requirement and the latency requirement that are configured for the S-NSSAI, determines, based on the security requirement, whether the isolated resource needs to be provided for the session, and determines, based on the latency requirement, whether the high-priority resource scheduling needs to be provided for the session, thereby ensuring security and latency of the end-to-end network slice.

The technical solution in Embodiment 1 may be used in combination with the technical solution in Embodiment 3. In this case, in the session establishment process, the terminal receives the security requirement indicated by the control plane network element. After the session establishment is completed, the terminal queries for a latency requirement configured for the session, determines, based on the security requirement, whether the isolated resource needs to be provided for the session, and determines, based on the latency requirement, whether the high-priority resource scheduling needs to be provided for the session, thereby ensuring the security and latency of the end-to-end network slice.

Based on a same concept, an embodiment of this application further provides a resource configuration apparatus. The apparatus may be configured to perform the steps performed by the terminal in FIG. 2. Therefore, for an implementation of the resource configuration apparatus provided in this embodiment of this application, refer to the implementations of the foregoing method.

Figure 9:
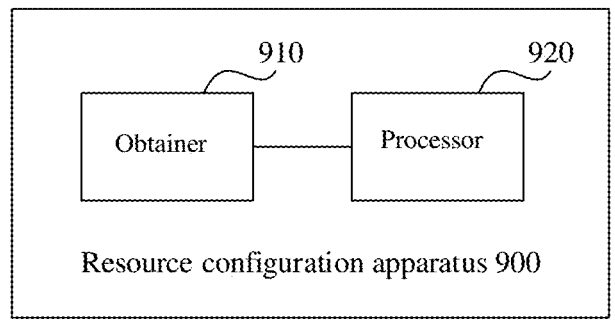
FIG. 9 is a schematic structural diagram of a resource configuration apparatus according to an embodiment of this application.

For example, referring to FIG. 9, an embodiment of this application provides a resource configuration apparatus 900, including:

an obtainer 910, configured to obtain a slice attribute corresponding to a slice type of a first session, where the slice attribute corresponding to the slice type includes at least one of a security requirement or a latency requirement of the slice type; and a processor 920, configured to perform resource configuration for the first session based on the slice attribute.

In a possible implementation, when obtaining the slice attribute corresponding to the slice type of the first session, the obtainer 910 is specifically configured to:

send a session establishment request message to a control plane network element, and receive a session establishment accept message from the control plane network element, where the session establishment accept message carries the slice type of the first session; and obtain, based on a mapping relationship that is between each slice type and each slice attribute and that is locally stored in the terminal, the slice attribute corresponding to the slice type of the first session.

In a possible implementation, when obtaining the slice attribute corresponding to the slice type of the first session, the obtainer 910 is specifically configured to:

send a session establishment request message to a control plane network element, and receive a session establishment accept message from the control plane network element, where the session establishment accept message carries the slice attribute corresponding to the slice type of the first session, and the slice attribute is the security requirement of the slice type.

In a possible implementation, when performing resource configuration for the first session based on the slice attribute, the processor 920 is specifically configured to:

if the slice attribute includes the security requirement of the slice type, determine, based on the security requirement of the slice type, whether to provide an isolated resource for the first session.

In a possible implementation, when performing resource configuration for the first session based on the slice attribute, the processor 920 is further configured to:

if the slice attribute includes the latency requirement of the slice type, determine, based on the latency requirement of the slice type, whether to provide high-priority resource scheduling for the first session.

Based on a same concept, this application further provides a terminal. The terminal may be configured to perform the steps performed by the terminal in FIG. 2. Therefore, for an implementation of the terminal provided in this embodiment of this application, refer to the implementations of the method.

Figure 10:
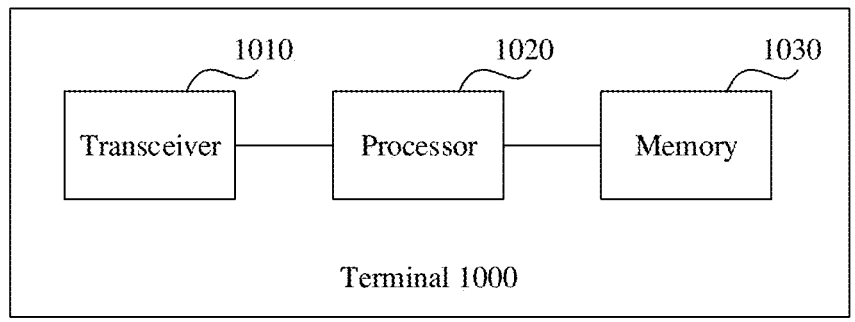
FIG. 10 is a schematic structural diagram of a terminal according to an embodiment of this application.

Referring to FIG. 10, an embodiment of this application provides a terminal 1000. The terminal includes a transceiver 1010, a processor 1020, and a memory 1030. The transceiver 1010, the processor 1020, and the memory 1030 may be connected to each other by using a bus system. The memory 1030 is configured to store a program, an instruction, or code. The processor 1020 is configured to execute the program, the instruction, or the code in the memory 1030, to specifically perform the following steps: obtaining a slice attribute corresponding to a slice type of a first session, where the slice attribute corresponding to the slice type includes at least one of a security requirement or a latency requirement of the slice type; and performing resource configuration for the first session based on the slice attribute.

It should be noted that in a specific implementation, a function of the obtainer 910 in FIG. 9 may be implemented by using the transceiver 1010 in FIG. 10, and a function of the processor 920 in FIG. 9 may be implemented by using the processor 1020 in FIG. 10.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to embodiments of this application without departing from the spirit and scope of this application. This application is intended to cover these modifications and variations provided that they fall within the scope defined by the following claims and their equivalent technologies.

What is claimed is:

1. A resource configuration method, comprising:
   obtaining, by a terminal, a slice attribute corresponding to a slice type of a first session, wherein the slice attribute corresponding to the slice type comprises at least one of a security requirement or a latency requirement of the slice type; and
   performing, by the terminal, resource configuration for the first session based on the slice attribute,
   wherein the security requirement comprises a resource isolation requirement of the first session, the resource isolation requirement indicates whether the terminal needs to provide an isolated resource for the first session, and the performing resource configuration for the first session comprises:
   upon determining that the slice attribute comprises the resource isolation requirement of the slice type, determining, by the terminal based on the resource isolation requirement of the slice type, whether to provide an isolated resource for the first session.

2. The method according to claim 1, wherein the obtaining the slice attribute comprises:
   sending, by the terminal, a session establishment request message to a control plane network element, and receiving a session establishment accept message from the control plane network element, wherein the session establishment accept message carries the slice type of the first session; and
   obtaining, by the terminal based on a mapping relationship that is between each slice type and its corresponding slice attribute and that is locally stored in the terminal, the slice attribute corresponding to the slice type of the first session.

3. The method according to claim 2, wherein the slice attribute comprises the security requirement and/or the latency requirement of the slice type.

4. The method according to claim 2, wherein the control plane network element comprises a session management function entity and an access and mobility management function entity.

5. The method according to claim 1, wherein the obtaining the slice attribute comprises:
   sending, by the terminal, a session establishment request message to a control plane network element, and receiving a session establishment accept message from the control plane network element, wherein the session establishment accept message carries the slice attribute corresponding to the slice type of the first session.

6. The method according to claim 5, wherein the slice attribute comprises the security requirement of the slice type.

7. The method according to claim 1, wherein the performing resource configuration for the first session further comprises:
   if the slice attribute comprises the latency requirement of the slice type, determining, by the terminal based on the latency requirement of the slice type, whether to provide high-priority resource scheduling for the first session.

8. The resource configuration method according to claim 1, wherein the isolated resource comprises a physically independent operating system, an independent central processing unit (CPU), or an isolated process group.

9. The resource configuration method according to claim 1, further comprising determining, by the terminal, a priority of resource scheduling for the first session based on the latency requirement of the slice type.

10. A resource configuration apparatus, comprising:
an interface;
a processor; and
a memory storing a program, the program including instructions that, when executed by the processor, control the processor to:
obtain a slice attribute corresponding to a slice type of a first session, wherein the slice attribute corresponding to the slice type comprises at least one of a security requirement or a latency requirement of the slice type; and
perform resource configuration for the first session based on the slice attribute,
wherein the security requirement comprises a resource isolation requirement of the first session, and the resource isolation requirement indicates whether the resource configuration apparatus needs to provide an isolated resource for the first session; and
wherein to perform resource configuration for the first session based on the slice attribute, the program includes instructions that, when executed by the processor, control the processor to:
upon determining that the slice attribute comprises the resource isolation requirement of the slice type, determine, based on the resource isolation requirement of the slice type, whether to provide an isolated resource for the first session.

11. The apparatus according to claim 10, wherein to obtain the slice attribute corresponding to the slice type of the first session, the program includes instructions that, when executed by the processor, control the processor to:
send a session establishment request message to a control plane network element, and receive a session establishment accept message from the control plane network element, wherein the session establishment accept message carries the slice type of the first session; and
obtain, based on a mapping relationship that is between each slice type and its corresponding slice attribute and that is locally stored in the apparatus, the slice attribute corresponding to the slice type of the first session.

12. The apparatus according to claim 11, wherein the slice attribute comprises the security requirement and/or a latency requirement of the slice type.

13. The apparatus according to claim 11, wherein the control plane network element comprises a session management function entity and an access and mobility management function entity.

14. The apparatus according to claim 10, wherein to obtain the slice attribute corresponding to the slice type of the first session, the program includes instructions that, when executed by the processor, control the processor to:
send a session establishment request message to a control plane network element, and receive a session establishment accept message from the control plane network element, wherein the session establishment accept message carries the slice attribute corresponding to the slice type of the first session.

15. The apparatus according to claim 10, wherein the slice attribute comprises the security requirement of the slice type.

16. The apparatus according to claim 10, wherein to perform resource configuration for the first session based on the slice attribute, the program includes instructions that, when executed by the processor, control the processor to:
if the slice attribute comprises the latency requirement of the slice type, determine, based on the latency requirement of the slice type, whether to provide high-priority resource scheduling for the first session.

17. A non-transitory computer readable storage medium storing instructions for use in a resource configuration apparatus, the instructions comprising:
first instructions that, when executed by a processor of the resource configuration apparatus, control the processor to obtain a slice attribute corresponding to a slice type of a first session, wherein the slice attribute corresponding to the slice type comprises at least one of a security requirement or a latency requirement of the slice type; and
second instructions that, when executed by the processor, control the processor perform resource configuration for the first session based on the slice attribute,
wherein the security requirement comprises a resource isolation requirement of the first session, the resource isolation requirement indicates whether an isolated resource needs to be provided for the first session, and the performing of the resource configuration for the first session comprises:
upon determining that the slice attribute comprises the resource isolation requirement of the slice type, determining, by the resource configuration apparatus based on the resource isolation requirement of the slice type, whether to provide an isolated resource for the first session.

* * * * *

UNITED STATES PATENT AND TRADEMARK OFFICE
CERTIFICATE OF CORRECTION

PATENT NO. : 11,483,801 B2
APPLICATION NO. : 16/778162
DATED : October 25, 2022
INVENTOR(S) : Fangyuan Zhu It is certified that error appears in the above-identified patent and that said Letters Patent is hereby corrected as shown below:

In the Specification

Column 16, Line 13, change "to the SME" to --to the SMF.--; and

Column 18, Line 20, change "to the SME" to --to the SMF.--.

Signed and Sealed this
Twenty-first Day of March, 2023

Katherine Kelly Vidal
*Director of the United States Patent and Trademark Office*